United States Patent
Aoki et al.

(10) Patent No.: US 7,227,675 B2
(45) Date of Patent: Jun. 5, 2007

(54) HOLOGRAM RECORDING MEDIUM, RECORDING/REPRODUCING APPARATUS AND METHOD THEREFOR

(75) Inventors: Ikuo Aoki, Yokohama (JP); Yoshitaka Takahashi, Yokohama (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 120 days.

(21) Appl. No.: 11/189,914

(22) Filed: Jul. 27, 2005

(65) Prior Publication Data
US 2006/0028702 A1 Feb. 9, 2006

(30) Foreign Application Priority Data

| Aug. 3, 2004 | (JP) | ............................ 2004-226730 |
| Oct. 5, 2004 | (KR) | ..................... 10-2004-0079207 |
| Jul. 20, 2005 | (KR) | ..................... 10-2005-0065674 |

(51) Int. Cl.
*G03H 1/00* (2006.01)

(52) U.S. Cl. ............................ 359/34; 359/35; 359/30; 385/37; 385/131; 399/31

(58) Field of Classification Search .................. 359/34, 359/30, 35; 385/37
See application file for complete search history.

(56) References Cited

U.S. PATENT DOCUMENTS

| 6,801,348 B2 * | 10/2004 | Ramapujam et al. | ......... 359/34 |
| 2003/0026542 A1 * | 2/2003 | Yoshikawa et al. | ........... 385/37 |
| 2004/0090904 A1 | 5/2004 | Lee et al. | |
| 2004/0095864 A1 | 5/2004 | Lee et al. | |

FOREIGN PATENT DOCUMENTS

| JP | 2000-4434 | 1/2000 |
| JP | 2002-74292 | 3/2002 |
| JP | 2002-074292 A | 3/2002 |
| JP | 2003-228848 | 8/2003 |
| JP | 2003-228848 A | 8/2003 |
| WO | WO 2004/017314 A1 | 2/2004 |

OTHER PUBLICATIONS

Search Report issued in International PCT Application No. PCT/KR2005/002508 on Nov. 16, 2005.
Office Action issued in Korean Patent Application No. 2005-65674 on Oct. 26, 2006.

* cited by examiner

*Primary Examiner*—Fayez G. Assaf
(74) *Attorney, Agent, or Firm*—Stein, McEwen & Bui, LLP (57) ABSTRACT

A hologram recording medium in which data is recorded at a high density, the input of a reference beam to an area to which data is not to be recorded of a recording layer is prevented when recording data to the hologram recording medium, and an amount of noise when reproducing the data from the hologram recording medium is reduced. The hologram recording medium includes a light velocity restriction member restricting an incidence area of a hologram recording layer, thus restricting the incidence of a reference beam onto the hologram recording layer, preventing the incidence of the reference beam onto an area to which data is not to be recorded of the hologram recording layer when recording data and reproducing the amount of noise when reproducing data.

34 Claims, 7 Drawing Sheets

HOLOGRAM RECORDING MEDIUM, RECORDING/REPRODUCING APPARATUS AND METHOD THEREFOR

CROSS-REFERENCE TO RELATED APPLICATIONS

This application claims the priorities of Japanese Patent Application No. 2004-226730, filed on Aug. 3, 2004 in the Japanese Intellectual Property Office, and the priority of Korean Patent Application No. 2004-79207, filed on Oct. 5, 2004 and No. 2005-65674, filed on Jul. 20, 2005 in the Korean Intellectual Property Office, the disclosures of which are incorporated herein in their entirety by reference.

BACKGROUND OF THE INVENTION

1. Field of the Invention

Aspects of the present invention relate to a recording medium, and more particularly, to a hologram recording medium on which data is recorded using interference fringes of an object beam and a reference beam.

2. Description of the Related Art

Recently, rewritable optical disks including phase change optical disks and conventional optical disks have become widely used as information recording media. In order to increase the recording density of such a rewritable optical disk, the diameter of a beam spot and the distance between adjacent tracks or adjacent bits must be reduced.

Although the recording density of rewritable optical disks has increased, the recording density of an optical disk is physically limited by a diffraction limit of a beam for recording data on a surface. Accordingly, the optical disk using a three dimensional recording in which the depth direction of the disk is used has been developed to increase recording density. Such an optical disk is called a hologram recording medium.

A hologram recording medium has a large capacity due to the three dimensional recording region and can be used at high speed due to a two dimensional recording/reproducing method, and has attracted public attention as a next generation computer recording medium. The holographic recording medium uses photosensitive material, such as a photopolymer or photorefractive crystal, to record interference patterns caused by the object beam and the reference beam. For example, a hologram recording medium may be formed by inserting a recording layer formed of a photopolymer, between two sheets of glass. In order to record data on such a hologram recording medium, an object beam and a reference beam corresponding to data to be recorded are irradiated on to the hologram recording medium to form interference fringes in the photopolymer. The object beam includes data or other information. In order to reproduce data from the hologram recording medium, a reference beam is irradiated onto the interference fringes to extract optical data corresponding to the recorded data.

In addition, cube shaped and card-shaped hologram recording media have been developed. In the case of a card-shaped hologram recording medium, a recording capacity is increased by increasing the number of recording layers on which a waveguide is formed. Japanese Laid-open Patent No. 2000-4434 discloses a method of recording data on a hologram recording medium.

In a conventional method of recording data on a hologram recording medium in multiple angles by using an object beam and a reference beam, the reference beam should be incident on a recording layer of the hologram recording medium at a precise incidence angle when recording/reproducing data. Thus, an optical device, such as a mirror, should be precisely controlled, resulting in an increase in size and cost of the optical device. Accordingly, a method of recording data on a hologram recording medium by focusing an object beam on at least one small area of a recording layer and focusing a reference beam on the small area is required. In this case, the hologram recording medium includes at least one core layer, which is interposed at a portion of the recording layer having a low refractive index to waveguide a beam, an optical waveguide which has at least one diffraction grating layer disposed at an interface between the core layer and the portion of the recording layer having a low refractive index or in the core layer, and at least one recording layer disposed outside of the optical waveguide to transmit a reference beam to the optical waveguide.

However, when a diffraction beam from the core layer is used as a reference beam, the reference beam is irradiated onto an entire surface of the recording layer of the hologram recording medium. Thus, the reference beam is incident on an area of the recording layer to which data is not to be recorded and the area to which data is not to be recorded is exposed to light not used to record data thereon. In spite of the exposition to light, data may be recorded on the recording layer. But, in this case, the quality of the recorded data may deteriorate. In addition, the reference beam may be input to an optical detector, which detects a reproduction beam, and the reference beam acts as noise, thus the data cannot be precisely reproduced. In a conventional method of recording data on a hologram recording medium, a diffraction grating layer and a recording layer cannot be separated, resulting in an increase in manufacturing costs and resulting in a security problem due to the easiness reproduction of data by a third person.

SUMMARY OF THE INVENTION

Aspects of the present invention provide a hologram recording medium in which the incidence of a reference beam onto an area of a hologram recording layer to which data is not to be recorded when recording data to the hologram recording layer, thus reducing noise when reproducing data from the hologram recording layer, and efficiently preventing the illegal recording and/or reproduction of data while reducing a manufacturing cost.

Additional aspects and/or advantages of the invention will be set forth in part in the description which follows and, in part, will be obvious from the description, or may be learned by practice of the invention.

According to an aspect of the present invention, there is provided a hologram recording medium including an optical waveguide layer including a plurality of cladding layers with a low refractive index, a plurality of core layers alternatively disposed with the cladding layers and guiding a beam, and a plurality of diffraction gratings disposed at the interfaces between the plurality of cladding layers and the plurality of core layers or in the plurality of core layers; a hologram recording layer to which data is recorded as a hologram by perpendicularly irradiating and focusing an object beam thereon, and irradiating a reference beam thereon by inputting the reference beam into one of the core layers and diffracting the reference beam with one of the diffraction gratings, and from which data is reproduced by irradiating the reference beam thereon through an object lens; and a light velocity restriction member interposed between the hologram recording layer and the optical waveguide layer, wherein the hologram recording layer, the optical waveguide layer, and the light velocity restriction member are integrally formed.

According to an aspect of the present invention, the hologram recording layer, the optical waveguide layer, and the light velocity restriction member between the hologram recording layer and the optical waveguide layer are integrally formed, which permits the hologram recording layer to be conveniently controlled. In addition, since the light velocity restriction member is interposed between the hologram recording layer and the optical waveguide layer, the reference beam diffracted by the optical waveguide layer may be irradiated to an area of the hologram recording layer to which the object beam is input and not to an area to which data is not to be recorded or a previously recorded area.

According to another aspect of the present invention, there is provided a hologram recording medium including an optical waveguide layer including a plurality of cladding layers with a low refractive index, a plurality of core layers alternatively disposed with the cladding layers and guiding a beam, and a plurality of diffraction gratings disposed at the interfaces between the plurality of cladding layers and the plurality of core layers or in the plurality of core layers; a hologram recording layer to which data is recorded as a hologram by perpendicularly irradiating and focusing an object beam thereon, and irradiating a reference beam thereon by inputting the reference beam into one of the core layers and diffracting the reference beam with one of the diffraction gratings, and from which data is reproduced by irradiating the reference beam thereon through an object lens; and a light velocity restriction member interposed between the hologram recording layer and the optical waveguide layer, wherein at least one of the hologram recording layer and the optical waveguide is disposed separately from the rest of the hologram recording medium.

According to an aspect of the present invention, at least one of the hologram recording layer and the optical waveguide layer is separated from the rest of the hologram recording medium, such that data is recorded and/or reproduced by exchanging the hologram recording layer. In addition, the reproduction of the data from the hologram recording layer may be prevented by separating the optical waveguide layer, because the reproduction of the data requires a reference beam identical to the reference beam irradiated when recording the data. In addition, when the optical waveguide layer is separated, other data may be recorded on the same hologram recording layer by using another optical waveguide layer. When the hologram recording layer and the optical waveguide layer are separated, the locations of the hologram recording layer and the optical waveguide layer are fixed so that the locations of the hologram recording layer and the optical waveguide layer need not to be adjusted.

According to another aspect of the present invention, there is provided a hologram recording medium including an optical waveguide layer including a plurality of cladding layers with a low refractive index, a plurality of core layers alternatively disposed with the cladding layers and guiding a beam, and a plurality of diffraction gratings disposed at the interfaces between the plurality of cladding layers and the plurality of core layers or in the plurality of core layers; a hologram recording layer to which data is recorded as a hologram by perpendicularly irradiating and focusing an object beam thereon, and irradiating a reference beam thereon by inputting the reference beam into one of the core layers and diffracting the reference beam with one of the diffraction gratings, and from which data is reproduced by irradiating the reference beam thereon through an object lens; and a light velocity restriction member interposed between the hologram recording layer and the optical waveguide layer, wherein at least the light velocity restriction member is fixed in a hologram recording/reproducing apparatus.

According to an aspect of the present invention, the hologram recording layer and the light velocity restriction member are fixed in the hologram recording and/or reproducing apparatus, such that the reproduction of data from the hologram recording layer by a third party may be prevented. In addition, other data may be recorded to the same hologram recording layer by using another optical waveguide layer. When the hologram recording layer and the optical waveguide layer are separated, the locations of the hologram recording layer and the optical waveguide layer are fixed so that the locations of the hologram recording layer and the optical waveguide layer need not be adjusted.

According to an aspect of the present invention, the optical waveguide layer includes a ROM in which hologram data is recorded. Accordingly, the reproduction of data may be performed by selectively transmitting a plurality of multiplexed reproduction beams generated during the reproduction of data.

According to an aspect of the present invention, the light velocity restriction member is an amplitude mask type liquid crystal spatial optical modulator.

According to an aspect of the present invention, a small area of the hologram recording medium is irradiated selectively for a short time by setting the pixels of a small mask area corresponding to the small area of the hologram recording medium to be transparent.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 1:
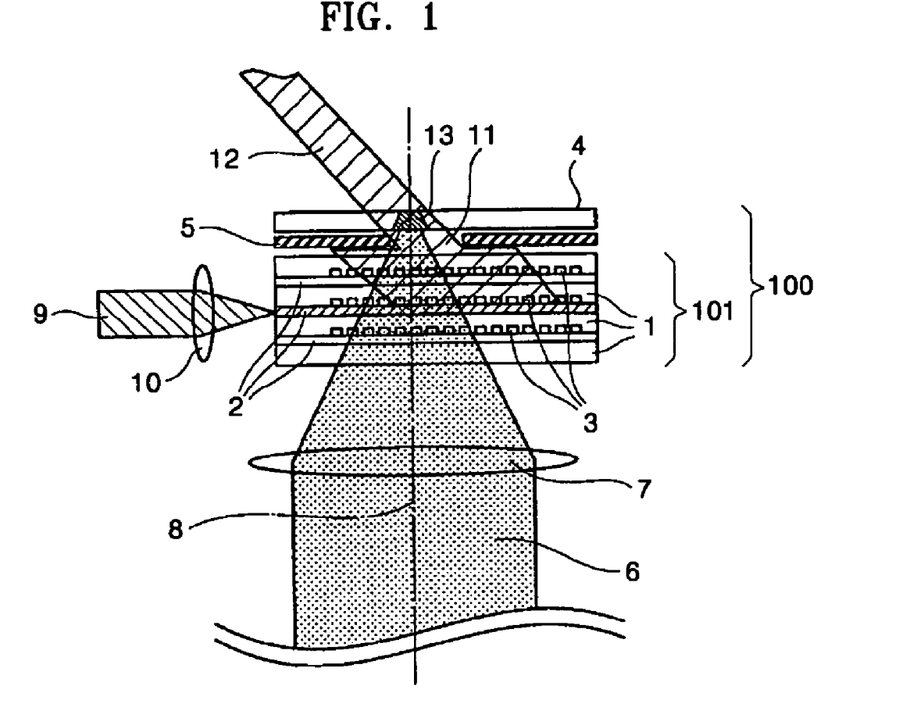
FIG. 1 is a sectional view of a hologram recording medium cut along a line including an optical axis of an object beam according to an embodiment of the present invention.

FIG. 1 is a sectional view of a hologram recording medium according to a first embodiment of the present invention cut along a plane including an optical axis 8 of an object beam to illustrate a method of recording data to the hologram recording medium 100.

Referring to FIG. 1, the hologram recording medium 100 includes an optical waveguide layer 101 and hologram recording layer 4 and a reference beam velocity restriction member 5. The optical waveguide layer 101 includes pluralities of cladding layers 1 and core layers 2, alternatively disposed, and optical waveguides formed of diffraction gratings 3 disposed at the interfaces between the cladding layers 1 and the core layers 2.

An object beam 6 including two-dimensional data is focused by a recording object lens 7 and irradiated onto a hologram recording layer 4 of the hologram recording medium 100. On the other hand, a reference beam 9 is input to a selected one of the core layers 2 by a focus lens 10 and diffracted by the diffraction grating 3 in the selected core layer 2. The reference beam 9 is irradiated as a reference beam 12 onto an area of the hologram recording layer 4 including the area on which the object beam 6 is irradiated.

The reference beam 12 is a part of the reference beam 9 which is diffracted by the diffraction grating 3 of the selected core layer 2 and passes through an opening portion 11 of the reference beam velocity restriction member 5 to pass around the object beam 6, which is irradiated onto the hologram recording layer 4. Accordingly, the object beam 6 and the reference beam 12 interfere at a polymerization area in the hologram recording layer 4, and the interference pattern is recorded on the hologram recording layer 4 as a three-dimensional hologram 13.

Figure 2:
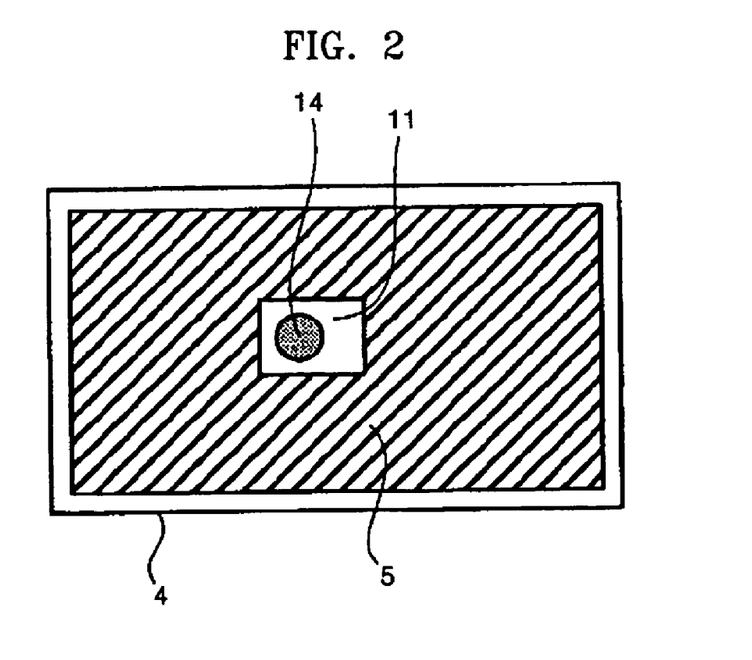
FIG. 2 is a plane view of the hologram recording medium of FIG. 1 from the side on which a hologram recording layer is disposed.

FIG. 2 is a plane view of the hologram recording medium 100 from the side of the hologram recording layer 4. Referring to FIG. 2, the hologram recording layer 4 is shown to be transparent in order to distinguish the opening portion 11 of the reference beam velocity restriction member 5.

Referring to FIG. 2, the opening portion 11 through which the reference beam 12 travels is formed around an object beam irradiation area 14 of the hologram recording layer 4, between the hologram recording layer 4 and the optical waveguide layer 101. Thus, the reference beam 12 is prevented from being incident on an area to which the object beam 6 is not incident and so data is not to be recorded. As a result, the reference beam 12 is irradiated onto only the recording area of the hologram recording layer 4 when recording/reproducing data using the reference beam regardless of the strength or the irradiation number of the reference beam 12, and the data recorded on another recording area of the hologram recording layer 4 is not erased.

The light velocity restriction member 5 covers the effective recording area of the hologram recording layer 4 while having the opening portion 11, which is slightly larger than the object beam irradiation area 14, exposing the area to which data is to be written. The opening portion 11 may be cone-shaped, a circle, or a triangle etc, as long as the opening portion 11 is larger than the object beam irradiation area 14.

Figure 3:
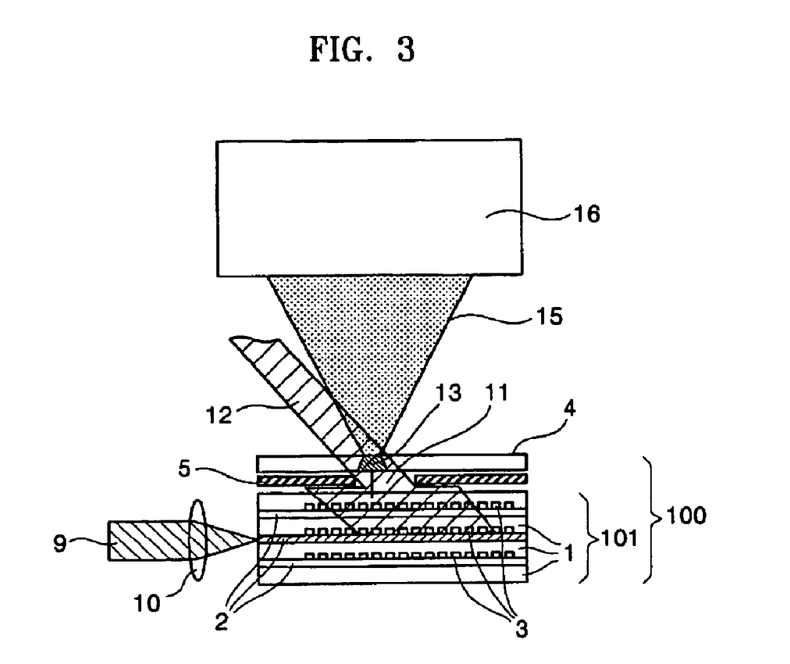
FIG. 3 is a sectional view illustrating a method of reproducing data from the hologram recording medium shown in FIG. 1.

A method of reproducing hologram data will now be described with reference to FIG. 3. Referring to FIG. 3, the reference beam 9 is focused by the focus lens 10 and input to a selected one of the core layers 2 when reproducing data. The beam is diffracted toward the hologram recording layer 4 by the diffraction grating 3 of the core layer 2, and the velocity of the beam is restricted at the opening portion 11 of the light velocity restriction member 5. The reference beam 12 passes through the opening portion 11 of the light velocity restriction member 5, and the reference beam 12 is irradiated on the hologram pattern 13, which is recorded on the hologram recording layer 4. A reproduction beam 15, diffracted at the hologram 13 of the hologram recording layer 4, is input to a reproducing optical system 16 to reproduce data.

Figure 4:
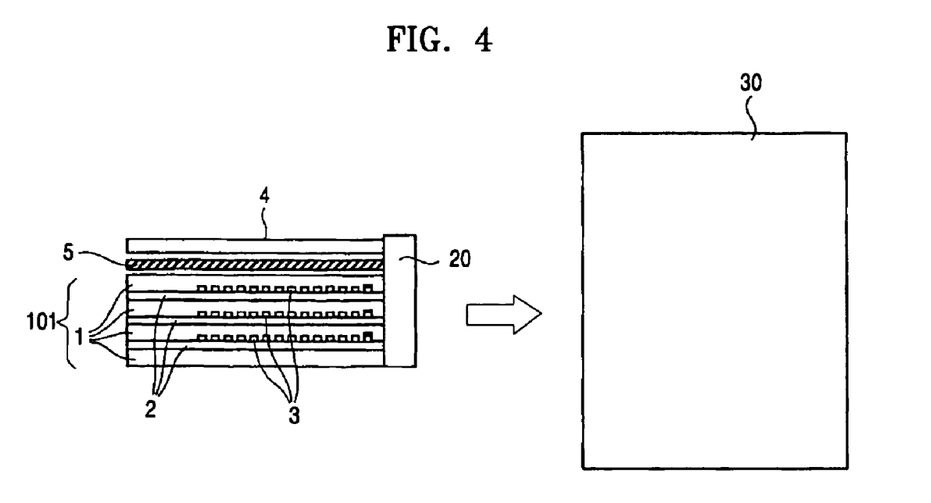
FIG. 4 is a sectional view of a hologram recording medium according to an embodiment of the present invention.

FIG. 4 is a sectional view of a hologram recording medium according to an embodiment of the present invention including a hologram recording layer 4, a reference beam velocity restriction member 5, and an optical waveguide layer 101 integrated by a support member 20. Accordingly, data may be recorded and/or reproduced to and/or from a hologram recording medium by inserting the integrated hologram recording medium into a hologram recording/reproducing apparatus 30.

Figure 5:
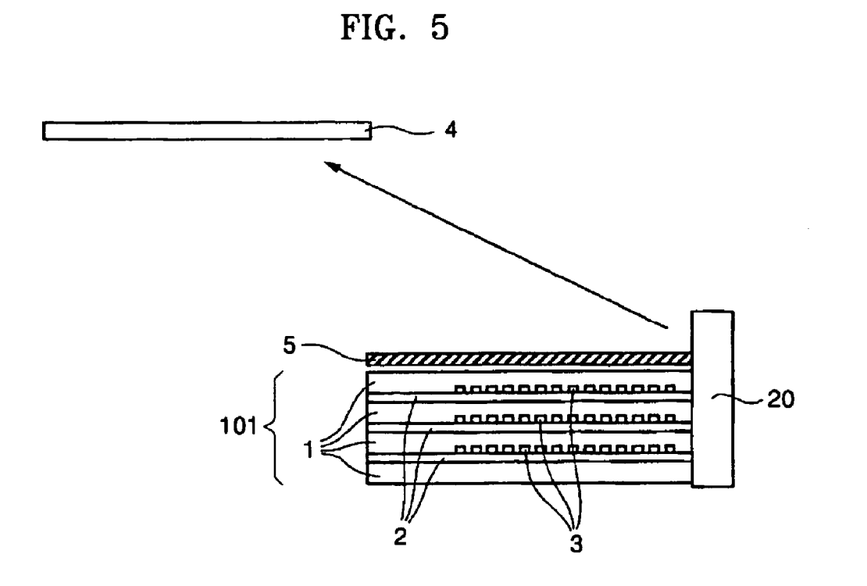
FIG. 5 is a sectional view of a hologram recording medium according to an embodiment of the present invention.

FIG. 5 is a sectional view of a hologram recording medium having the same structure as the hologram recording medium illustrated in FIG. 4, except the hologram recording layer can be separated from the support member 20. Accordingly, data may be recorded and/or reproduced by exchanging only a hologram recording layer.

Figure 6:
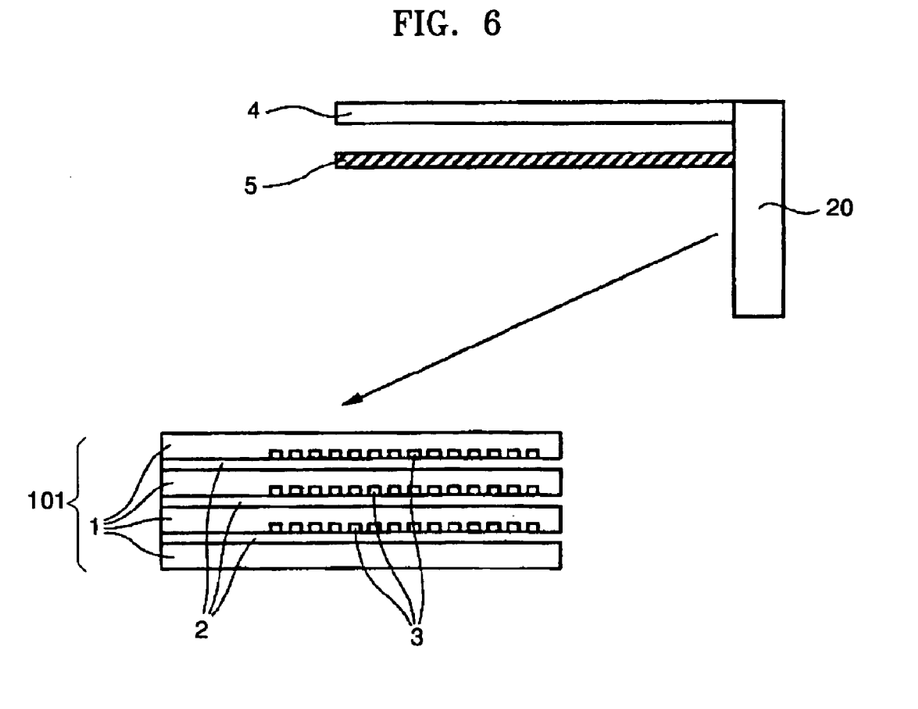
FIG. 6 is a sectional view of a hologram recording medium according to an embodiment of the present invention.

FIG. 6 is a sectional view of a hologram recording medium having the same structure as the hologram recording medium illustrated in FIG. 4, except the optical waveguide layer 101 is separated from the support member 20. Accordingly, a third person does not know the state of a reference beam required to reproduce data, resulting in the prevention of the reproduction of the recorded data by a third person. In addition, it is possible to record additional data on the same hologram recording layer by inserting another optical waveguide layer.

Figure 7:
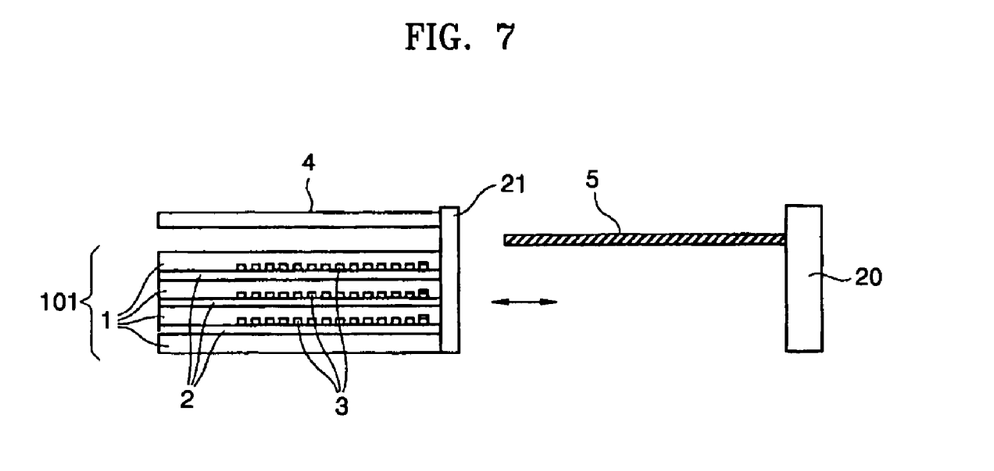
FIG. 7 is a sectional view of a hologram recording medium according to an embodiment of the present invention.

FIG. 7 is a sectional view of a hologram recording medium including a reference beam velocity restriction member 5 supported by a support member 20 and a hologram recording layer 4 and an optical waveguide layer 101 supported by a connection member 21. The hologram recording layer 4 and the optical waveguide layer 101 may be detachably connected to the support member 20. Accordingly, the locations of the hologram recording layer 4 and the optical waveguide layer 101 are fixed, and thus there is no need to adjust the location of the hologram recording layer 4 and the optical waveguide layer 101.

Figure 8:
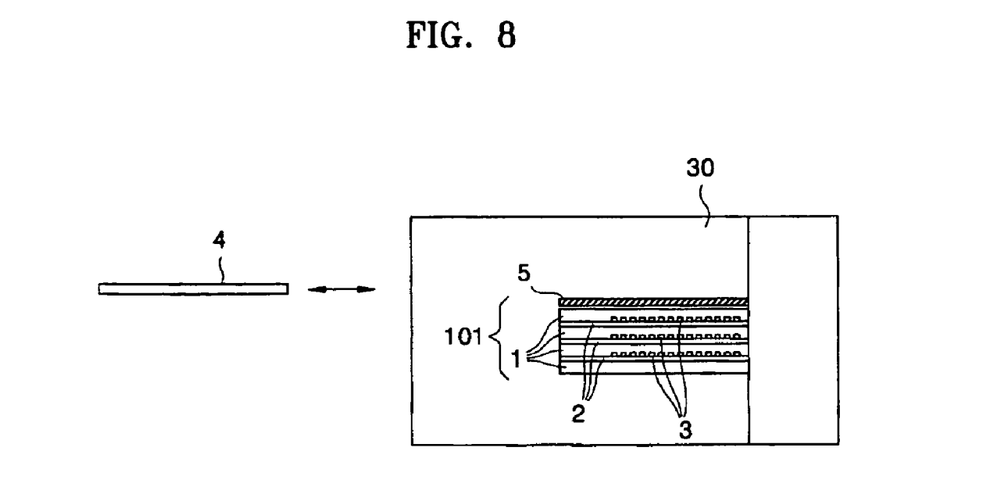
FIG. 8 is a sectional view of a hologram recording medium having a portion fixed in a recording and/or reproducing apparatus according to an embodiment of the present invention.

FIG. 8 is a sectional view of a hologram recording medium including an optical waveguide layer 101 and a reference beam velocity restriction member 5 fixed in a hologram recording and/or reproducing apparatus 30. A hologram recording layer 4 is inserted into the hologram recording and/or reproducing apparatus 30 to record and/or reproduce data. Accordingly, the recording and/or reproducing of data may be performed by exchanging the hologram recording layer 4. Thus, multiple hologram recording layers 4 may be interchanged in a manner similar to that presently used with DVDs.

Figure 9:
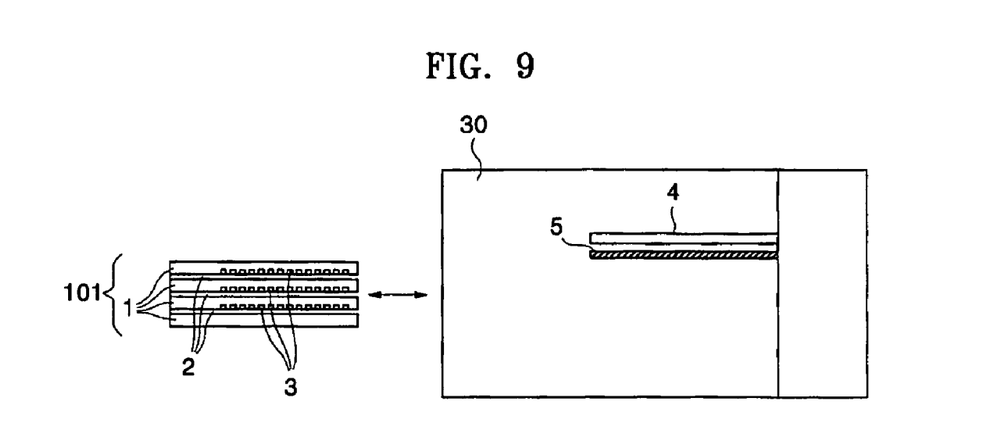
FIG. 9 is a sectional view of a hologram recording medium having a portion fixed in a recording and/or reproducing apparatus according to an embodiment of the present invention.

FIG. 9 is a sectional view of a hologram recording medium including a hologram recording layer 4 and a reference beam restriction member 5 fixed in a hologram recording and/or reproducing apparatus 30. An optical waveguide layer 101 is inserted into the hologram recording and/or reproducing apparatus 30 to record and/or reproduce data. Accordingly, it is impossible for a third person to know the state of a reference beam for reproducing data, and thus a third person cannot reproduce data from the hologram recording layer 4. This serves as a form of security to the data stored on the hologram recording layer 4. In addition, new data can be recorded to the same hologram recording layer 4 by inserting another optical waveguide layer.

Figure 10:
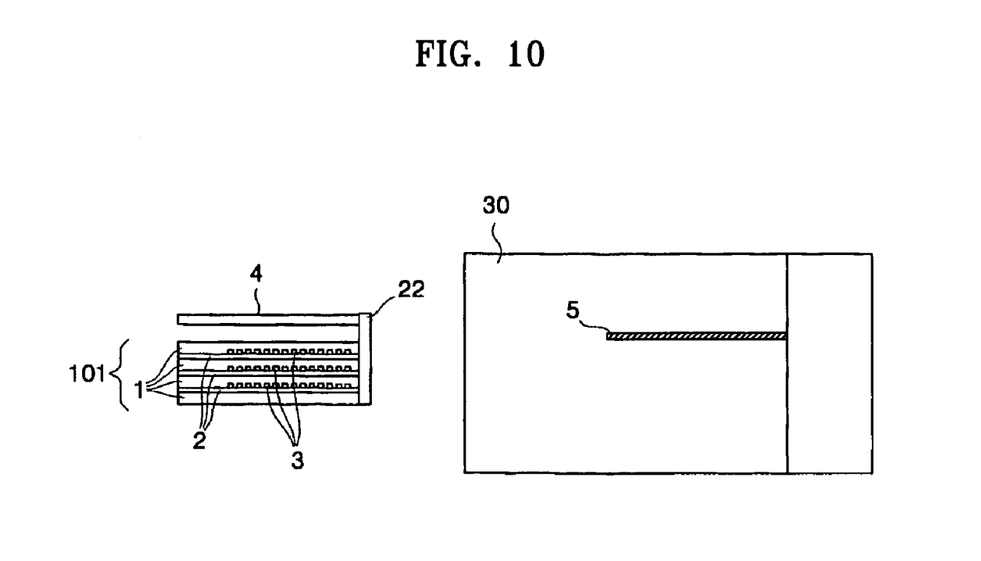
FIG. 10 is a sectional view of a hologram recording medium having a portion fixed in a recording and/or reproducing apparatus according to an embodiment of the present invention.

FIG. 10 is a sectional view of a hologram recording medium including reference beam velocity restriction member 5 fixed in a hologram recording and/or reproducing apparatus 30, and a hologram recording layer 4 and an optical waveguide layer 101 connected to a connection member 22. The hologram recording layer 4 and the optical waveguide layer 101 connected to the connection member 22 are inserted in the hologram recording and/or reproducing apparatus 30 to record and/or reproduce data. Accordingly, the locations of the hologram recording layer 4 and the optical waveguide layer 101 are fixed, thus the control of the locations of the hologram recording layer 4 and the optical waveguide layer 101 is not required.

Figure 11:
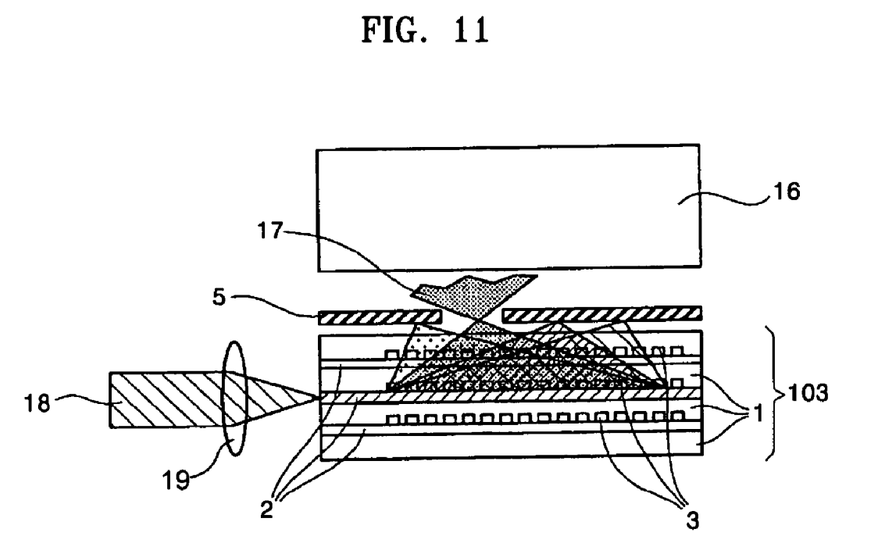
FIG. 11 is a sectional view of a hologram recording medium having a ROM medium according to another embodiment of the present invention.
Figure 12:
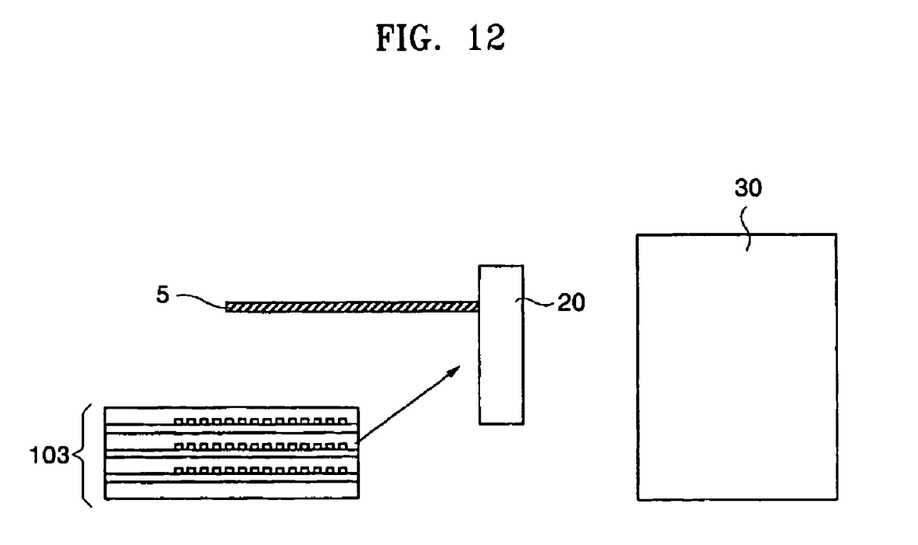
FIG. 12 is a sectional view of a hologram recording medium having a ROM medium and a support member according to an embodiment of the present invention.

FIGS. 11 and 12 are sectional views of a hologram recording medium according to another embodiment of the present invention. Referring to FIG. 11, the hologram recording medium includes an optical waveguide layer 103 and a reference beam velocity restriction member 5. The optical waveguide layer 103 includes pluralities of cladding layers 1 and core layers 2 alternatively disposed and diffraction gratings 3 formed at the interfaces between the cladding layers 1 and the core layers 2. The optical waveguide layer 103 is, for example, a ROM medium using hologram recording on which data are repeatedly recorded. When reproducing data from the hologram recording medium, a reference beam 18 is input to one of the core layers 2 through a focus lens 19. Accordingly, a reproduction beam 17 depending on the data recorded on the optical waveguide layer is diffracted toward the upper side of the optical waveguide layer 103 and is input to a reproducing optical system 16 to reproduce data. The structure of the optical waveguide layer 103 illustrated in FIG. 11 is the same as the structure of the optical waveguide layer 101 illustrated in FIGS. 1 and 4–10.

A method of reproducing data from the hologram recording medium will now be described in detail with reference to FIG. 12. Referring to FIG. 12, the hologram recording layer 4 and an optical waveguide layer 101, illustrated in FIGS. 4–10, are removed from a support member 20 of the hologram recording medium, and then an optical waveguide layer 103 is installed in the support member 20 instead of the optical waveguide layer 101. The support member 20 is inserted in a hologram recording and/or reproducing apparatus 30. Thereafter, a reference beam 18 is input to a selected one of the core layers 2. As a result, a reproduction beam 17 produced by data stored in the optical waveguide layer 103 is diffracted toward the reference beam velocity restriction member 5, and the reproduction beam 17 is selected by the reference beam velocity restriction member 5 and is input to a reproduction optical system 16 to reproduce data.

The reference beam velocity restriction member 5 can be fixed in a hologram recording and/or reproducing apparatus 30 as shown in FIGS. 8 through 10, with the ROM medium as the optical waveguide layer 103 inserted instead of the optical waveguide layer 101, thus the same reproducing operation can be performed.

Figure 13:
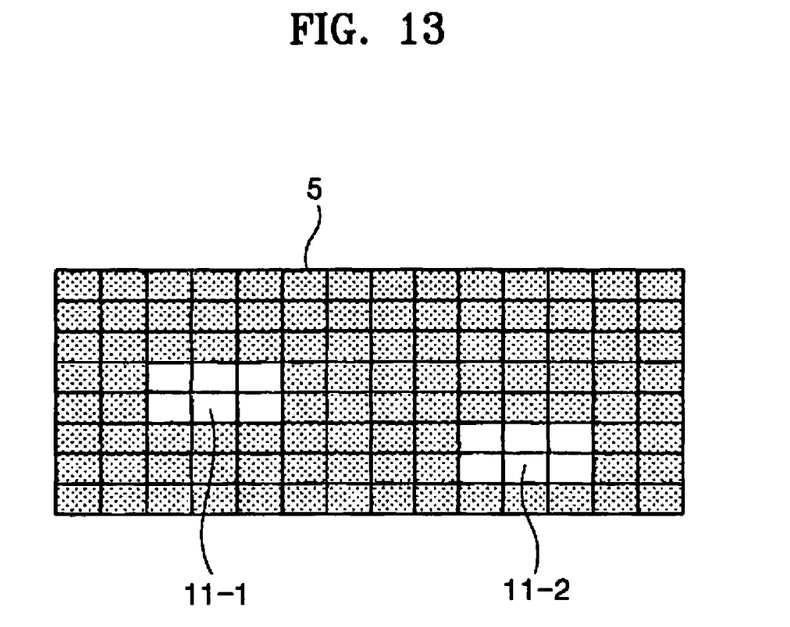
FIG. 13 illustrates an amplitude mask type crystal liquid spatial optical modulator used as a light velocity restriction member.

An amplitude mask type liquid crystal spatial optical modulator illustrated in FIG. 13 may be used as a reference beam velocity restriction member 5. The amplitude mask type liquid crystal spatial optical modulator includes a plurality of transparent pixels 11-1 and 11-2 that form opening portions. Accordingly, a small area of a hologram recording medium may be irradiated selectively for a while.

Figure 14:
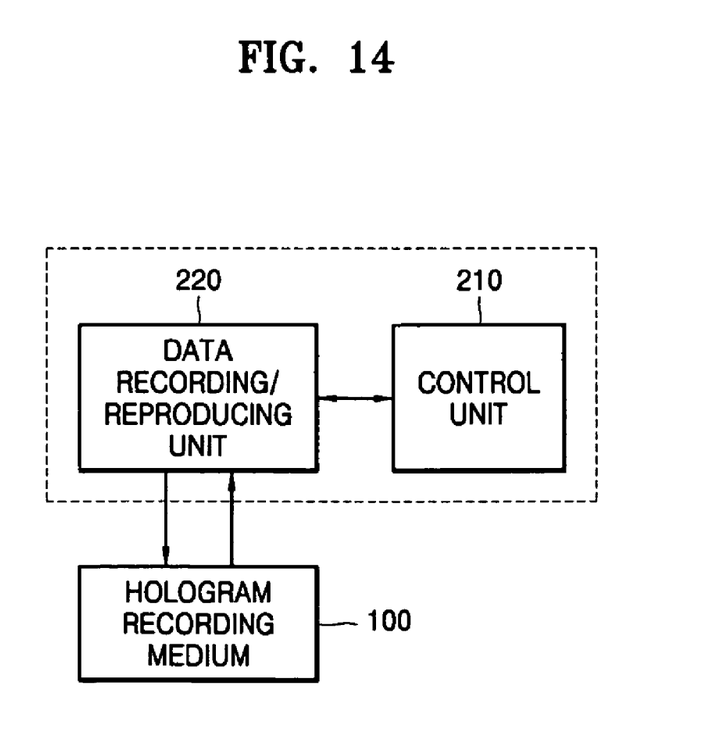
FIG. 14 is a block diagram of an apparatus for recording/reproducing of a hologram recording medium according to the present invention.

FIG. 14 is a block diagram of an apparatus for recording/reproducing of a hologram recording medium according to the present invention. Referring to FIG. 14, the apparatus for recording/reproducing a hologram recording medium 100 according to aspects of the present invention comprises a data recording/reproducing unit 220 and a control unit 210. The data recording/reproducing unit 220 records data as a hologram by irradiating and focusing an object beam 6 on the hologram recording layer 4 and irradiating the reference beam 9 on a selected one of the core layers 2 of the optical waveguide layer 101. Further, the data recording/reproducing unit 220 reproduces data recorded on the hologram recording layer by inputting a reproducing beam which passes selectively through the light velocity restriction member 5 and which is diffracted by the diffraction grating 3. The control unit 210 controls a irradiation location of the object beam 6 and the reference beam 9. Similarly, the apparatus for recording/reproducing a hologram recording medium can be used to reproduce data recorded on the optical waveguide layer 103 of a hologram recording medium of FIG. 11.

According to aspects of the present invention, the incidence of a reference beam onto an area to which data is not to be recorded may be prevented when recording data to a hologram recording medium. Accordingly, a problem of a reference beam corrupting an unintended area is avoided.

In addition, since at least one of a hologram recording layer or an optical waveguide layer may be separated from the rest of the hologram recording medium, the price of the hologram recording medium is lowered, and a third person cannot reproduce data from the hologram recording medium.

Furthermore, since a hologram recording layer and an optical waveguide layer may be separated from a hologram recording medium and a ROM may be substituted for the optical waveguide layer, the hologram recording medium can be interoperated with a ROM medium including an optical waveguide layer.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A hologram recording medium, comprising:
   an optical waveguide layer, comprising:
   a plurality of cladding layers with a low refractive index;
   a plurality of core layers alternatively disposed with the cladding layers; and
   a plurality of diffraction gratings disposed at interfaces between the cladding layers and the core layers or in the plurality of core layers;
   a hologram recording layer to which data is recorded as a hologram by perpendicularly irradiating and focusing an object beam thereon, and irradiating a reference beam thereon by inputting the reference beam into one of the plurality of core layers and diffracting the reference beam with one of the plurality of diffraction gratings, and from which the data is reproduced by irradiating the reference beam thereon through an object lens; and
   a light velocity restriction member interposed between the hologram recording layer and the optical waveguide layer,
   wherein the hologram recording layer, the optical waveguide layer, and the light velocity restriction member are integrally formed.

2. The hologram recording medium of claim 1, wherein the light velocity restriction member is an amplitude mask type liquid crystal spatial optical modulator.

3. A hologram recording medium, comprising:
   an optical waveguide layer, comprising:
   a plurality of cladding layers with a low refractive index;
   a plurality of core layers alternatively disposed with the plurality of cladding layers; and
   a plurality of diffraction gratings disposed at interfaces between the plurality of cladding layers and the plurality of core layers or in the plurality of core layers;
   a hologram recording layer to which data is recorded as a hologram by perpendicularly irradiating and focusing an object beam thereon, and irradiating a reference beam thereon by inputting the reference beam into one of the plurality of core layers and diffracting the reference beam with one of the plurality of diffraction gratings, and from which the data is reproduced by irradiating the reference beam thereon through an object lens; and
   a light velocity restriction member interposed between the hologram recording layer and the optical waveguide layer,
   wherein at least one of the hologram recording layer or the optical waveguide is disposed separately from the rest of the hologram recording medium.

4. The hologram recording medium of claim 3, wherein the light velocity restriction member is an amplitude mask type liquid crystal spatial optical modulator.

5. A hologram recording medium, comprising:
   an optical waveguide layer, comprising:
   a plurality of cladding layers with a low refractive index;
   a plurality of core layers alternatively disposed with the plurality of cladding layers; and
   a plurality of diffraction gratings disposed at interfaces between the plurality of cladding layers and the plurality of core layers or in the plurality of core layers;
   a hologram recording layer to which data is recorded as a hologram by perpendicularly irradiating and focusing an object beam thereon, and irradiating a reference beam thereon by inputting the reference beam into one of the plurality of core layers and diffracting the reference beam with one of the plurality of diffraction gratings, and from which the data is reproduced by irradiating the reference beam thereon through an object lens; and
   a light velocity restriction member interposed between the hologram recording layer and the optical waveguide layer,
   wherein at least the light velocity restriction member is fixed in a hologram recording/reproducing apparatus.

6. The hologram recording medium of claim 5, wherein the light velocity restriction member is an amplitude mask type liquid crystal spatial optical modulator.

7. A hologram recording medium, comprising:
   an optical waveguide layer, comprising:
   a plurality of cladding layers with a low refractive index;
   a plurality of core layers alternatively disposed with the cladding layers; and
   a plurality of diffraction gratings disposed at interfaces between the cladding layers and the core layers or in the plurality of core layers;
   a light velocity restriction member which restricts a light velocity of a reproduction beam which is irradiated to the optical waveguide layer and diffracted by the diffraction gratings,
   wherein the optical waveguide layer is ROM medium using hologram recording, and from which the data is reproduced by the reproduction beam which is inputted by irradiating the reference beam thereon.

8. The hologram recording medium of claim 7, wherein the light velocity restriction member is an amplitude mask type liquid crystal spatial optical modulator.

9. An information storage medium for use with a recording/reproducing apparatus, the information storage medium comprising:
   a first layer which comprises a hologram to store information;
   a second waveguide layer which optically controls access to the first layer by the recording/reproducing apparatus such that data is recorded to or reproduced from the first layer; and
   a velocity restriction member interposed between the first layer and the second wavepuide layer.

10. The information storage medium of claim 9, wherein one of the first layer and the second waveguide layer is fixed in the recording/reproducing apparatus, and the remaining layer is detachably coupled with the recording/reproducing apparatus.

11. The information storage medium of claim 9, wherein the velocity restriction member is opaque, except for an opening portion to prevent a reference beam from the recording/reproducing apparatus from being incident on an unintended area of the first layer.

12. The information storage medium of claim 9, wherein the second waveguide layer and the velocity restriction member are fixed in the recording/reproducing apparatus such that the first layer removably couples with the recording/reproducing apparatus and is readable only with the second waveguide layer and velocity restriction member of the recording/reproducing apparatus.

13. The information storage medium of claim 9, wherein the first layer and the second waveguide layer are removably coupled with the recording/reproducing apparatus and the velocity restriction member is fixed in the recording/reproducing apparatus.

14. The information storage medium of claim 9, wherein the velocity restriction member is an amplitude mask type liquid crystal spatial optical modulator.

15. The information storage medium of claim 14, wherein pixels of the amplitude mask type liquid crystal spatial optical modulator are transparent to form opening portions for a reference beam from the recording/reproducing apparatus to selectively irradiate a corresponding portion of the first layer.

16. The information storage medium of claim 15, wherein the second waveguide layer includes a ROM in which hologram data corresponding to the first layer is recordable.

17. The information storage medium, of claim 16, wherein at least one of the first layer and the second waveguide layer are removably coupled with the information storage medium.

18. The information storage medium of claim 17, wherein by inserting a new layer with a different configuration additional data is recordable on the first layer.

19. The information storage medium of claim 9, further comprising:
    a housing which removably holds at least one of the first layer and the second waveguide layer.

20. The information storage medium of claim 19, wherein the velocity restriction member is opaque, except for an opening portion to prevent a reference beam from the recording/reproducing apparatus from being incident on an unintended area of the first layer.

21. The information storage medium of claim 20, wherein the velocity restriction member is an amplitude mask type liquid crystal spatial optical modulator.

22. A method of recording data to a hologram recording medium comprising an optical waveguide layer, comprising a plurality of cladding layers with a low refractive index; a plurality of core layers alternatively disposed with the cladding layers; and a plurality of diffraction gratings disposed at interfaces between the cladding layers and the core layers or in the plurality of core layers; a hologram recording layer to which data is recorded as a hologram and to which a reference beam is inputted through the optical waveguide layer, the method comprising:
    irradiating and focusing an object beam on the hologram recording layer;
    irradiating the reference beam on one of the core layer of the optical waveguide layer; and
    restricting the reference beam diffracted with one of the plurality of diffraction gratings by a predetermined light velocity restriction member.

23. The method of claim 22, wherein the light velocity restriction member is interposed between the hologram recording layer and the optical waveguide layer.

24. The method of claim 22, wherein the light velocity restriction member is an amplitude mask type liquid crystal spatial optical modulator.

25. The method of claim 22, wherein the light velocity restriction member is disposed separately from a rest of the hologram recording medium.

26. A method of reproducing data from a hologram recording medium comprising an optical waveguide layer, comprising a plurality of cladding layers with a low refractive index; a plurality of core layers alternatively disposed with the cladding layers; and a plurality of diffraction gratings disposed at interfaces between the cladding layers and the core layers or in the plurality of core layers; a hologram recording layer to which data is recorded as a hologram and to which a reference beam is inputted through the optical waveguide layer, the method comprising:
    irradiating the reference beam on the one of the core layer of the optical waveguide layer;
    restricting the reference beam diffracted with one of the plurality of diffraction gratings and irradiated on the hologram recording layer by a predetermined light velocity restriction member; and
    reproducing the data recorded on the hologram recording layer by inputting a reproducing beam which passes selectively through the predetermined light velocity restriction member and which is diffracted by the diffraction grating.

27. The method of claim 26, wherein the light velocity restriction member is interposed between the hologram recording layer and the optical waveguide layer.

28. The method of claim 26, wherein the light velocity restriction member is an amplitude mask type liquid crystal spatial optical modulator.

29. The method of claim 26, wherein the light velocity restriction member is disposed separately from a rest of the hologram recording medium.

30. A method of reproducing data from a hologram recording medium comprising an optical waveguide layer, comprising a plurality of cladding layers with a low refractive index; a plurality of core layers alternatively disposed with the cladding layers; and a plurality of diffraction gratings disposed at interfaces between the cladding layers and the core layers or in the plurality of core layers, wherein the optical wave guide layer is a ROM medium using hologram recording, the method comprising;
    irradiating a reference beam on one of the core layers of the optical waveguide layer; and
    reproducing data recorded on a predetermined location of the optical waveguide layer by inputting a reproducing beam which passes selectively through a predetermined light velocity restriction member and which is diffracted by the diffraction grating.

31. The method of claim 30, wherein the light velocity restriction member is an amplitude mask type liquid crystal spatial optical modulator.

32. The method of claim 30, wherein the light velocity restriction member is disposed separately from the optical waveguide layer.

33. A recording/reproducing apparatus for use with a hologram recording medium comprising an optical waveguide layer, comprising a plurality of cladding layers with a low refractive index; a plurality of core layers alternatively disposed with the cladding layers; and a plurality of diffraction gratings disposed at interfaces between the cladding layers and the core layers or in the plurality of core layers; a hologram recording layer; and a light velocity restriction member interposed between the hologram recording layer and the optical waveguide layer, the apparatus comprising:
    a data recording/reproducing unit which records data as a hologram by irradiating and focusing an object beam on the hologram recording layer and irradiating a reference beam on one of the core layers of the optical waveguide layer, and which reproduces the data recorded on the hologram recording layer by inputting a reproducing beam which passes selectively through the light velocity restriction member and which is diffracted by the diffraction grating; and
    a control unit which controls an irradiation location of the object beam and the reference beam.

34. An apparatus of reproducing data of a hologram recording medium comprising an optical waveguide layer, comprising a plurality of cladding layers with a low refractive index; a plurality of core layers alternatively disposed with the cladding layers; and a plurality of diffraction gratings disposed at interfaces between the cladding layers and the core layers or in the plurality of core layers, wherein the optical wave guide layer is a ROM medium using hologram recording, the apparatus comprising:

a data reproducing unit which irradiates a reference beam on one of the core layers of the optical waveguide layer and reproduces data recorded on the optical waveguide layer by inputting a reproducing beam which passes selectively through a predetermined light velocity restriction member and which is diffracted by the diffraction grating; and     a control unit which controls an irradiation location of the reference beam.

* * * * *

UNITED STATES PATENT AND TRADEMARK OFFICE
CERTIFICATE OF CORRECTION

PATENT NO. : 7,227,675 B2
APPLICATION NO. : 11/189914
DATED : June 5, 2007
INVENTOR(S) : Ikuo Aoki et al.

Page 1 of 1

It is certified that error appears in the above-identified patent and that said Letters Patent is hereby corrected as shown below:

Column 10, line 48,
change "wavepuide" to --waveguide--

Column 11, line 16,
delete ",", first occurrence.

Signed and Sealed this

Thirteenth Day of November, 2007

JON W. DUDAS
*Director of the United States Patent and Trademark Office*